United States Patent
Yamazaki et al.

(10) Patent No.: US 8,284,375 B2
(45) Date of Patent: Oct. 9, 2012

(54) LIQUID CRYSTAL DISPLAY DEVICE AND MANUFACTURING METHOD THEREOF

(75) Inventors: Shunpei Yamazaki, Tokyo (JP); Hideaki Kuwabara, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 12/541,187

(22) Filed: Aug. 14, 2009

(65) Prior Publication Data
US 2010/0034963 A1 Feb. 11, 2010

Related U.S. Application Data

(62) Division of application No. 10/757,459, filed on Jan. 15, 2004, now Pat. No. 7,609,358.

(30) Foreign Application Priority Data

Jan. 16, 2003 (JP) .................................. 2003-008869

(51) Int. Cl.
G02F 1/13 (2006.01)
(52) U.S. Cl. ........................................................ 349/187
(58) Field of Classification Search .................. 349/187
See application file for complete search history.

(56) References Cited

U.S. PATENT DOCUMENTS

| 3,892,471 | A |   | 7/1975  | Biermann et al. |
| 4,325,610 | A |   | 4/1982  | Inoue |
| 4,409,268 | A |   | 10/1983 | Inoue et al. |
| 4,470,667 | A |   | 9/1984  | Okubo et al. |
| 4,482,213 | A |   | 11/1984 | Piliavin et al. |
| 4,691,995 | A |   | 9/1987  | Yamazaki et al. |
| 4,705,345 | A |   | 11/1987 | Ayliffe et al. |
| 4,773,737 | A |   | 9/1988  | Yokono et al. |
| 5,550,091 | A |   | 8/1996  | Fukuda et al. |
| 5,673,092 | A | * | 9/1997  | Horie et al. ............. 349/86 |
| 5,796,458 | A |   | 8/1998  | Koike et al. |
| 5,929,961 | A |   | 7/1999  | Nishi et al. |
| 6,055,035 | A |   | 4/2000  | von Gutfeld et al. |
| 6,183,917 | B1|   | 2/2001  | Sakamoto et al. |

(Continued)

FOREIGN PATENT DOCUMENTS

CN 1321911 11/2001

(Continued)

OTHER PUBLICATIONS

Office Action (Application No. 200410001982.2; CN6904), dated Apr. 10, 2009 with English translation.

(Continued)

*Primary Examiner* — Phu Vu
(74) *Attorney, Agent, or Firm* — Nixon Peabody LLP; Jeffrey L. Costellia

(57) ABSTRACT

As the screen size becomes larger, it is required to make the device achieve higher definition, higher open area ratio, and higher reliability. Further, requirements for improvements in productivity and cost minimization are also increased. In the present invention, a substrate is pasted with a counter substrate after the liquid crystal material 114 is discharged (or dripped) only over a pixel area that is on a pixel electrode provided over a substrate with a large area by ink jet. Further, both of applying a seal material and dripping of a liquid crystal may be performed to the counter substrate. The total amount of liquid crystal use in a manufacturing process is reduced by forming a liquid crystal layer by ink jet.

13 Claims, 10 Drawing Sheets

U.S. PATENT DOCUMENTS

| | | | |
|---|---|---|---|
| 6,226,067 B1 | 5/2001 | Nishiguchi et al. | |
| 6,277,529 B1 | 8/2001 | Marumoto et al. | |
| 6,320,640 B2 | 11/2001 | Nishi et al. | |
| 6,331,884 B1 * | 12/2001 | Masazumi et al. | 349/156 |
| 6,476,899 B2 | 11/2002 | Ishida et al. | |
| 6,638,781 B1 | 10/2003 | Hirakata et al. | |
| 6,639,647 B1 * | 10/2003 | Inou | 349/189 |
| 6,646,709 B2 | 11/2003 | Matsumoto | |
| 6,671,030 B2 | 12/2003 | Gyoda | |
| 6,831,725 B2 | 12/2004 | Niiya | |
| 6,839,123 B2 | 1/2005 | Nishi et al. | |
| 6,851,460 B2 | 2/2005 | Tamai | |
| 6,952,020 B1 | 10/2005 | Yamazaki et al. | |
| 7,253,131 B2 | 8/2007 | Watanabe et al. | |
| 2001/0004281 A1 | 6/2001 | Sasaki | |
| 2001/0052959 A1 | 12/2001 | Tamatani et al. | |
| 2002/0027636 A1 | 3/2002 | Yamada | |
| 2002/0036746 A1 | 3/2002 | Ishida et al. | |
| 2002/0063842 A1 * | 5/2002 | Gyoda | 349/187 |
| 2003/0025868 A1 | 2/2003 | Hiroshima et al. | |
| 2003/0043338 A1 | 3/2003 | Liou et al. | |
| 2003/0090609 A1 | 5/2003 | Inoue et al. | |
| 2003/0128328 A1 * | 7/2003 | Yokoue et al. | 349/187 |
| 2003/0169378 A1 * | 9/2003 | Kim et al. | 349/20 |
| 2004/0224435 A1 | 11/2004 | Shibata et al. | |
| 2004/0233374 A1 | 11/2004 | Yamazaki et al. | |
| 2005/0105039 A1 | 5/2005 | Nishi et al. | |
| 2005/0134787 A1 | 6/2005 | Kim | |
| 2007/0021524 A1 | 1/2007 | Watanabe et al. | |

FOREIGN PATENT DOCUMENTS

| | | |
|---|---|---|
| EP | 0 977 076 A2 | 2/2000 |
| EP | 1 405 888 A1 | 4/2004 |
| JP | 47-018298 | 9/1972 |
| JP | 49-126350 | 12/1974 |
| JP | 50-015495 | 5/1975 |
| JP | 51-065656 | 6/1976 |
| JP | 53-091763 | 8/1978 |
| JP | 57-124827 | 8/1982 |
| JP | 59-057221 | 4/1984 |
| JP | 59-171925 | 9/1984 |
| JP | 59-195222 | 11/1984 |
| JP | 60-021028 | 2/1985 |
| JP | 60-075817 | 4/1985 |
| JP | 60-111221 | 6/1985 |
| JP | 60-126624 | 7/1985 |
| JP | 61-190313 | 8/1986 |
| JP | 62-015520 | 1/1987 |
| JP | 62-251723 | 11/1987 |
| JP | 09-026578 A | 1/1997 |
| JP | 11-109388 | 4/1999 |
| JP | 2000-284295 | 10/2000 |
| JP | 2001-117105 A | 4/2001 |
| JP | 2001-183640 | 7/2001 |
| JP | 2001-312214 | 11/2001 |
| JP | 2002-014360 | 1/2002 |
| JP | 2002-040442 | 2/2002 |
| JP | 2002-122872 | 4/2002 |
| JP | 2002-214626 | 7/2002 |
| JP | 2002-318378 A | 10/2002 |
| JP | 2002-350871 | 12/2002 |
| TW | 417024 | 1/2001 |
| TW | 525030 | 3/2003 |
| WO | WO-02/092718 A1 | 11/2002 |

OTHER PUBLICATIONS

1984 International Symposium Digest of Technical Papers, *"Active Matrix Adressing"* First Ed.; Jun. 1984; pp. 74-75.

Taiwanese Office Action (Application No. 93100831; TW06904) Dated Sep. 15, 2011.

* cited by examiner

LIQUID CRYSTAL DISPLAY DEVICE AND MANUFACTURING METHOD THEREOF

FIELD OF THE INVENTION

The present invention relates to a liquid crystal display device and a manufacturing method thereof. For example, the present invention relates to an electro-optic device typified by a liquid crystal display panel including a circuit formed from a thin film transistor (hereinafter referred to as a TFT) and an electronic device equipped with such an electro-optic device as a component.

RELATED ART

In late years, techniques for forming a thin film transistor (TFT) using semiconductor thin film (a thickness of around several nanometers to several hundred nanometers) formed over a substrate having an insulating surface has been attracting attention. Thin film transistors are broadly applied to electronic devices such as an IC or an electro-optic device, and are particularly developed as switching elements for image display devices at a rapid rate.

Conventionally, a liquid crystal display device is known as an image display device. Active matrix liquid crystal display devices are mostly used since they can offer higher definition images in comparison with passive matrix liquid crystal display devices. As to an active matrix liquid crystal display device, an image is generated on a screen by driving pixel electrodes arranged in matrix. Specifically, optical modulation of a liquid crystal layer disposed between a pixel electrode and a counter electrode is performed by applying voltage between the selected pixel electrode and a counter electrode corresponding to the pixel electrode. The optical modulation is recognized as an image by an observer.

The application range of such an electro-optic device of an active matrix type has been broaden, and it is required to make the device achieve higher definition, higher open area ratio, and higher reliability as well as to make the screen have a larger area. Further, requirements for improvements in productivity and cost minimization are also increased.

The inventor proposes a technique wherein a liquid crystal is dripped, which is described in Reference 1 (Reference 1: U.S. Pat. No. 4,691,995).

As the panel size is increased, the cost of materials in use is increased. In particular, a liquid crystal material that is disposed between a pixel electrode and a counter electrode is expensive.

Complicated steps such as making a seal pattern, pasting a counter substrate, dividing a substrate, injecting a liquid crystal, and closing an inlet of the liquid crystal are required for encapsulating the liquid crystal. Especially, when the panel size becomes larger, it is difficult to inject a liquid crystal by capillary attraction and to fill the area (including at least a pixel area) surrounded by a seal material with the liquid crystal.

When two substrates are pasted together, divided, and filled with a liquid crystal material from a liquid crystal inlet in a plane formed by the dividing step, a portion reaching a pixel area from the liquid crystal inlet, which is to be a passage of the liquid crystal material, would also be filled. Further, when a driver circuit portion is provided on one substrate that is provided with a pixel area, not only the pixel area but also a part where is overlapped with the driver circuit portion would be also filled with the liquid crystal. Thus, a superfluous part as well as the area that is to be a display part would also be filled with a liquid crystal material.

Since the passage reaching the pixel area from the inlet of the liquid crystal, the vicinity of the inlet of the liquid crystal in particular, becomes a part where further more liquid crystal material passes compared to other portions in a panel, the surface of the alignment layer may be transformed due to the friction on injecting the liquid crystal, thereby causing disorder of orientation in the liquid crystal.

SUMMARY OF THE INVENTION

The present invention provides a method for efficiently manufacturing a liquid crystal display device using such a substrate with a large area as 320 mm×400 mm, 370 mm×470 mm, 550 mm×650 mm, 600 mm×720 mm, 680 mm×880 mm, 1000 mm×1200 mm, 1100 mm×1250 mm, or 1150 mm×1300 mm. Moreover, the present invention provides a method for manufacturing a liquid crystal display device that is suitable for mass production using such a substrate with a large area as 1500 mm 1800 mm, 1800 mm×2000 mm, 2000 mm×2100 mm, 2200 mm×2600 mm, or 2600 mm×3100 mm.

Thereupon, in the present invention, the substrate is pasted to the counter substrate provided with a seal material after the liquid crystal material is discharged (or dripped) only over the pixel electrodes that are formed over the substrate, that is, over the pixel area by employing ink jet under reduced pressure. Both of applying a seal material and dripping of a liquid crystal may be performed to the counter substrate or to the substrate provided with the pixel area.

Note that, the seal material is applied so as to surround the pixel area with a closed pattern, and the space in the closed pattern is filled with the liquid crystal. A piezo system that is applied for ink-jet printers may be employed for ink jet since controllability of droplets is high and kinds of ink can be selected freely. Note that, the piezo system has two types: a MLP (Multi Layer Piezo) type and a ML Chip (Multi Layer Ceramic Hyper Integrated Piezo Segments) type.

Note that, in the present invention, plural droplets of a minute amount of liquid crystal are discharged (or dripped) to the pixel electrodes. The minute amount of the liquid crystal can be freely controlled with the number of discharging times or the number of spots.

A treatment chamber in which the liquid crystal is discharged (or dripped) by ink jet may be provided with a sensor camera. The sensor camera verifies the spot and transmits the position information to a system for moving an ink-jet head. For example, the ink-jet head is moved according to the pattern that is stored in a memory; the misalignments are recognized by the camera and stored as data. The discharge (or drip) pattern that is stored in the memory is modified or fine adjusted based on the data.

It is preferable to discharge (or to drip) the liquid crystal by ink jet under reduced pressure thereby preventing impurities from being mixed. While the liquid crystal is discharged (or dripped), the viscosity of the liquid crystal is lowered by heating the substrate. Further, the film thickness may be uniformed by spinning the substrate after the application of the liquid crystal by ink jet, if necessary. It is preferable to paste the substrates under reduced pressure to prevent bubbles from being mixed.

The seal material can be applied by seal dispensing, printing method, or ink jet. It is also preferable that the application of the seal material be also carried out under reduced pressure so as to prevent impurities from being mixed.

A liquid crystal is not altered or cured even under reduced pressure. On occasion, a seal material is mixed with a solvent so as to control the viscosity. Accordingly, when the seal material is applied under reduced pressure, it is preferable to use an involatile solvent to avoid alteration or curing.

The configuration of the present invention disclosed in this specification includes a manufacturing method of a liquid crystal display device, wherein a plurality of droplets of liquid crystal or droplets containing a liquid crystal are discharged on a pixel electrode under reduced pressure, and a liquid crystal layer is formed with the droplets of the liquid crystal applied to the pixel electrode.

The present invention eliminates a waste of material by applying the required amount of a liquid crystal to required areas alone. Further, the seal pattern shall be closed-loop, so that the seal patterns of the inlet of the liquid crystal and the passage thereof are unnecessary. Accordingly, generation of defects (such as defective orientation) can be avoided during the liquid crystal injection.

A material of the liquid crystal is not limited particularly as long as it can be discharged from a nozzle by ink jet; the liquid crystal may be mixed with a photo-curing material, thermosetting material, or the like thereby improving the adhesion between the pair of the substrates after the injection of the liquid crystal.

A twisted nematic (TN) mode is mostly employed as an alignment mode of a liquid crystal. In this mode, the alignment direction of liquid crystal molecules is twisted at 90° according to the polarization of light from its entrance to the exit. When manufacturing a TN liquid crystal display device, an alignment layer is formed on both of the substrates; a rubbing is performed; the substrates are pasted together so that the rubbing direction of the substrates are orthogonalized. Further, a liquid crystal layer may be formed by moving the ink-jet nozzle relatively to the direction of rubbing.

It is preferable to select a material that does not dissolve in or react to a liquid crystal even when it touches the liquid crystal for the seal material. A seal material contacting the liquid crystal, which surrounds the pixel area may further be surrounded by the second seal material thereby doubly surrounding the pixel area. It is preferable when the substrates are pasted under reduced pressure, that a space between the first and second seal materials be filled with a filler material other than a liquid crystal, such as a resin.

In the present invention, it is possible to apply a seal material, to drip liquid crystal and to paste substrates serially in reduced pressure without exposing the substrates to the outside of a processing chamber. Therefore, reduction of processing time can be achieved.

The substrates may be pasted together after a liquid crystal is discharged (or dripped) over both of the substrates to prevent bubbles from being mixed. A liquid crystal layer may be formed by moving the ink-jet nozzle relatively to the direction of rubbing for pasting the substrates together so that the rubbing directions of the substrates are orthogonalized. Further, an alignment layer may be selectively formed by ink jet as well as the liquid crystal layer.

The gap between the pair of the substrates may be maintained by sprinkling spherical spacers, forming a column spacer formed of resin, or mixing fillers into the seal material.

The substrates are pasted together and divided thereafter in the present invention.

When one panel is manufactured from one substrate, the dividing step can be omitted by pasting the substrate with a counter substrate that is cut in advance. Conventionally, the inlet of liquid crystal is formed at an end face by the dividing step after pasting.

When both of the applications of a seal material and liquid crystal are performed to the substrate provided with a pixel area, the configuration of the present invention disclosed in this specification includes a manufacturing method of a liquid crystal display device provided with a pair of substrates and liquid crystal retained between the pair of the substrates, including the steps of: forming a seal material that surrounds a pixel area provided over the first substrate; discharging a plurality of droplets of liquid crystal or droplets containing a liquid crystal only over a region that is surrounded by the seal material under reduced pressure; pasting the first substrate to the second substrate; and dividing the pasted pair of the substrates.

When a substrate is pasted to a counter substrate that is provided with a seal material, the configuration of the present invention disclosed in this specification includes a manufacturing method of a liquid crystal display device provided with a pair of substrates and a liquid crystal retained between the pair of the substrates, including the steps of: discharging a plurality of droplets of liquid crystal or droplets containing liquid crystal only over a region provided with the first substrate that is surrounded by the seal material under reduced pressure; pasting the second substrate that is patterned with a seal material to the first substrate; and dividing the pasted pair of the substrates.

When liquid crystal is formed on both of the substrates, the configuration of the present invention disclosed in this specification includes a manufacturing method of a liquid crystal display device provided with a pair of substrates and liquid crystal retained between the pair of the substrates, including the steps of patterning the first substrate or the second substrate with a seal material; forming the first liquid crystal layer by selectively discharging a plurality of droplets of liquid crystal or droplets containing liquid crystal over the first substrate under reduced pressure; forming the second liquid crystal layer by selectively discharging a plurality of droplets of liquid crystal or droplets containing liquid crystal over the second substrate under reduced pressure; and pasting the pair of the substrates so that the liquid crystal layers of the first substrate and the second substrate contact and overlap one another.

Further according to each of the methods above, the plurality of droplets are discharged on a pixel electrode provided on a pixel area from a plurality of nozzles.

Further according to each of the methods above, the step of discharging the plurality of droplets of liquid crystal or droplets containing liquid crystal is carried out while a substrate is heated.

Further according to each of the methods above, the steps of pasting the pair of the substrates is carried out in an inert atmosphere under the atmospheric pressure, or under reduced pressure. It is preferable that the pair of the substrates be also pasted together under reduced pressure without being exposed to the atmosphere thereby reducing the time of the step.

Further according to each of the methods above, the reduced pressure denotes an inert atmosphere under $1\times10^2$ Pa to $2\times10^4$ Pa or a vacuum under 1 Pa to $5\times10^4$ Pa.

A state under reduced pressure (including a state in a vacuum) is under a pressure lower than the atmospheric pressure. For example, an atmosphere containing an inert gas such as nitrogen or rare gas (hereinafter referred to as an inert atmosphere) may be under $1\times10^2$ Pa to $2\times10^4$ Pa (preferably $5\times10^2$ to $5\times10^3$ Pa).

Further according to each of the methods above, a liquid crystal material can be applied intermittently or continuously by appropriately setting the discharging condition or selecting a liquid crystal material.

Further according to each of the methods above, the substrate may be heated at from a room temperature (typically 20° C.) to 200° C. when the liquid crystal is discharged.

Further according to each of the methods above, the step of discharging the plurality of droplets of liquid crystal or droplets containing liquid crystal is carried out by ink jet.

A liquid crystal display device mainly has two types: a passive matrix type (simple matrix type) and an active type (active matrix type); the present invention can be applied to either of the types.

Another configuration of the present invention includes a liquid crystal display device provided with a pair of substrates and liquid crystal retained between the pair of the substrates, including: the pair of the substrates which are pasted one another with the first seal material that surrounds a pixel area and the second seal material that surrounds the first seal material; a liquid crystal retained in a region surrounded by the first seal material; and a filler material filled between the first seal material and the second seal material.

According to the above structure, the first and second seal materials have closed patterns.

Further according to the above structure, a driver circuit is disposed between the first and second seal materials.

The present invention provides a liquid crystal display device achieving high efficiency in the use of a liquid crystal material and high throughput.

DETAILED DESCRIPTION OF THE INVENTION

Embodiment modes of the present invention will be described below.

Embodiment Mode 1

FIGS. 1A to 4B show examples for manufacturing four panels from one substrate with a large area.

Figure 1A:
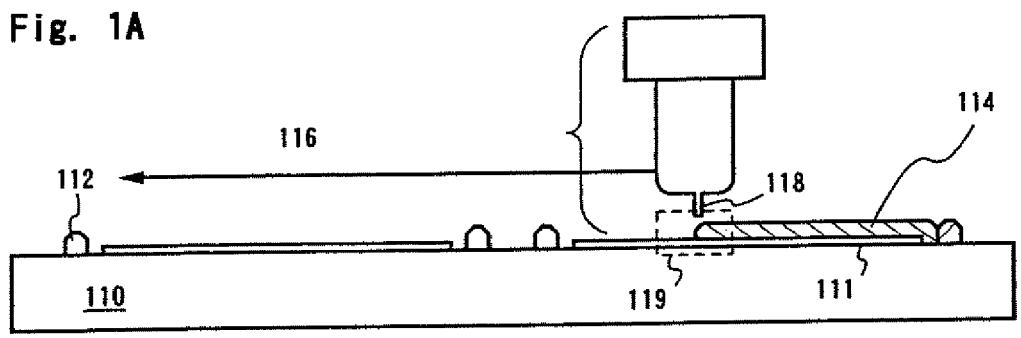
FIGS. 1A to 1D illustrate the Embodiment Mode 1.

FIG. 1A shows a cross section of a liquid crystal layer being formed by ink jet. A liquid crystal material 114 is discharged, sprayed, or dripped from a nozzle 118 of an ink jet system 116 so as to cover a pixel area 111 that is surrounded by a seal material 112. The ink-jet system 116 is moved to the direction of the arrow in FIG. 1A. Note that, the nozzle 118 is moved here; however, the liquid crystal layer may be formed by moving the substrate while the nozzle is fixed.

Figure 1B:
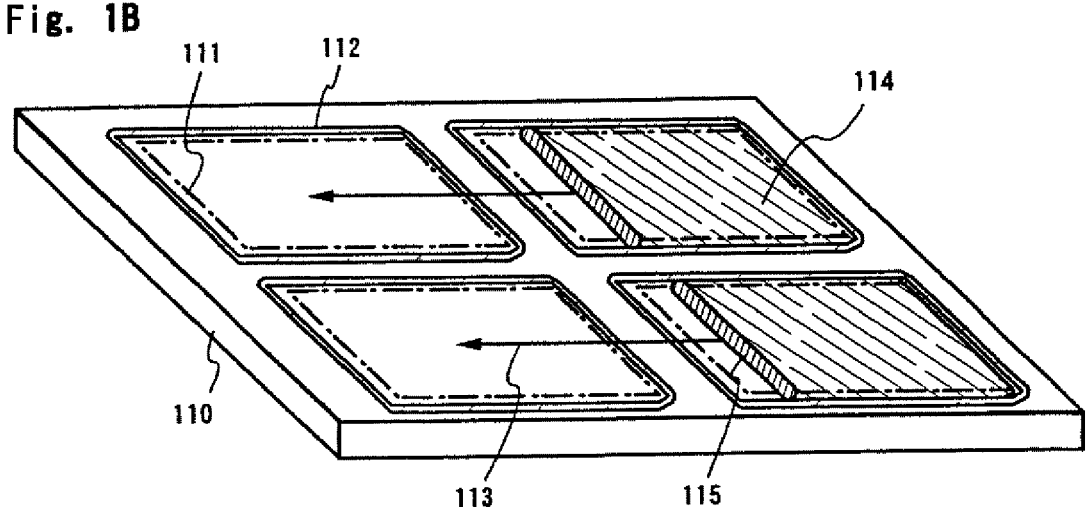

FIG. 1B shows a perspective view. The liquid crystal material 114 is selectively discharged, sprayed, or dripped only over the area surrounded by the seal material 112, and an object surface 115 is moved correspondingly to a nozzle scan direction 113.

Figure 1C:
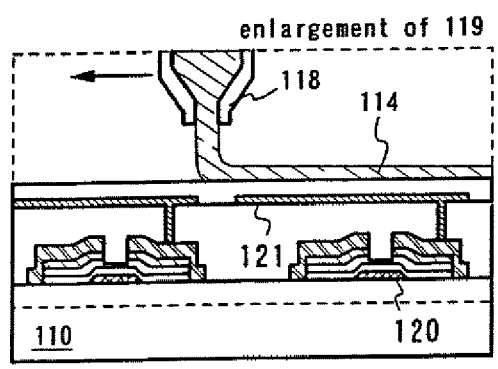
Figure 1D:
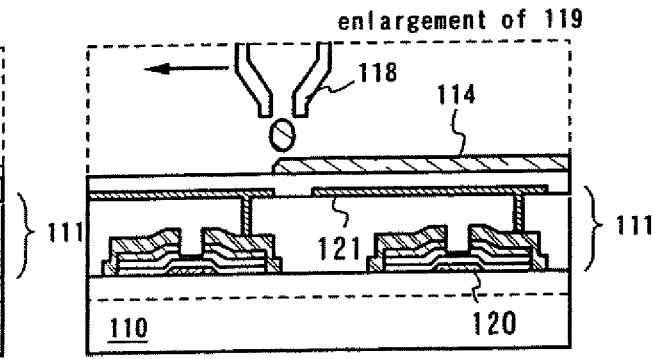

FIGS. 1C and 1D show enlarged cross sections of an area surrounded by a dotted line in FIG. 1A. When the liquid crystal material has high viscosity, it is discharged continuously and applied in a manner where each droplet of the liquid crystal material is joined to one another. On the other hand, when the viscosity of the liquid crystal material has low viscosity, it is discharged intermittently and the droplets are dripped as shown in FIG. 1D.

In FIG. 1C, reference numeral 120 denotes an inversely staggered TFT and reference numeral 121 denotes a pixel electrode. The pixel area 111 is formed from a pixel electrode arranged in matrix; a switching element being connected to the pixel electrode, an inversely staggered TFT is used here; and a storage capacitor (not illustrated).

An active layer of the inversely staggered TFT can be formed fitly from an amorphous semiconductor film, a semiconductor film having a crystalline structure, a compound semiconductor film having an amorphous structure, or the like. Further, a semi-amorphous semiconductor film (also referred to as a micro crystalline semiconductor film) having a partially ordered structure and a lattice strain may also be used for the active layer of the TFT. The semi-amorphous semiconductor film generally has a structure in between amorphous and crystalline structure (including single crystal and poly crystal) and has the third state stable from a standpoint of free energy. The semi-amorphous semiconductor film includes 0.5 nm to 20 nm of crystal grains at least at a part of the film. The Raman spectrum of semi-amorphous silicon is in a lower wavenumber than 520 $cm^{-1}$, which is a wavenumber characteristic of single crystalline silicon. Further, the diffraction peak of (111) and (220), which is believed to originate in a Si crystalline lattice, is observed in the semi-amorphous silicon film by X-ray diffraction. Further, the semi-amorphous semiconductor film is added with at least 1 atomic percent of hydrogen or halogen as a passivator for dangling bonds. A semi-amorphous semiconductor film is formed by depositing silicide gas by glow discharge (plasma CVD). $SiH_4$, in addition, $Si_2H_6$, $SiH_2Cl_2$, $SiHCl_3$, $SiCl_4$, $SiF_4$, or the like can be used for the silicide gas. The silicide gas may be diluted in one or more rare gas elements selected from the group consisting of $H_2$, a mixture of $H_2$ and He, Ar, Kr, and Ne. The dilution ratio is in a range of 1:2 to 1:1000. The pressure is in a range of about 0.1 Pa to 133 Pa. The power supply frequency is in a range of 13 MHz to 60 MHz, preferably 1 MHz to 120 MHz. The substrate heating temperature may be at most at 300° C., preferably 100° C. to 250° C. As for the impurity element in a film, concentrations of impurities of atmospheric constituents such as oxygen, nitrogen, or carbon is preferably $1 \times 10^{20}/cm^3$ at most; in particular, the oxygen concentration shall be $5 \times 10^{19}/cm^3$ at most, more preferably $1 \times 10^{19}/cm^3$. Note that, the field-effect mobility (μ) of a TFT that has a semi-amorphous semiconductor film as an active layer is 1 $cm^2/Vsec$ to 10 $cm^2/Vsec$.

Figure 2A:
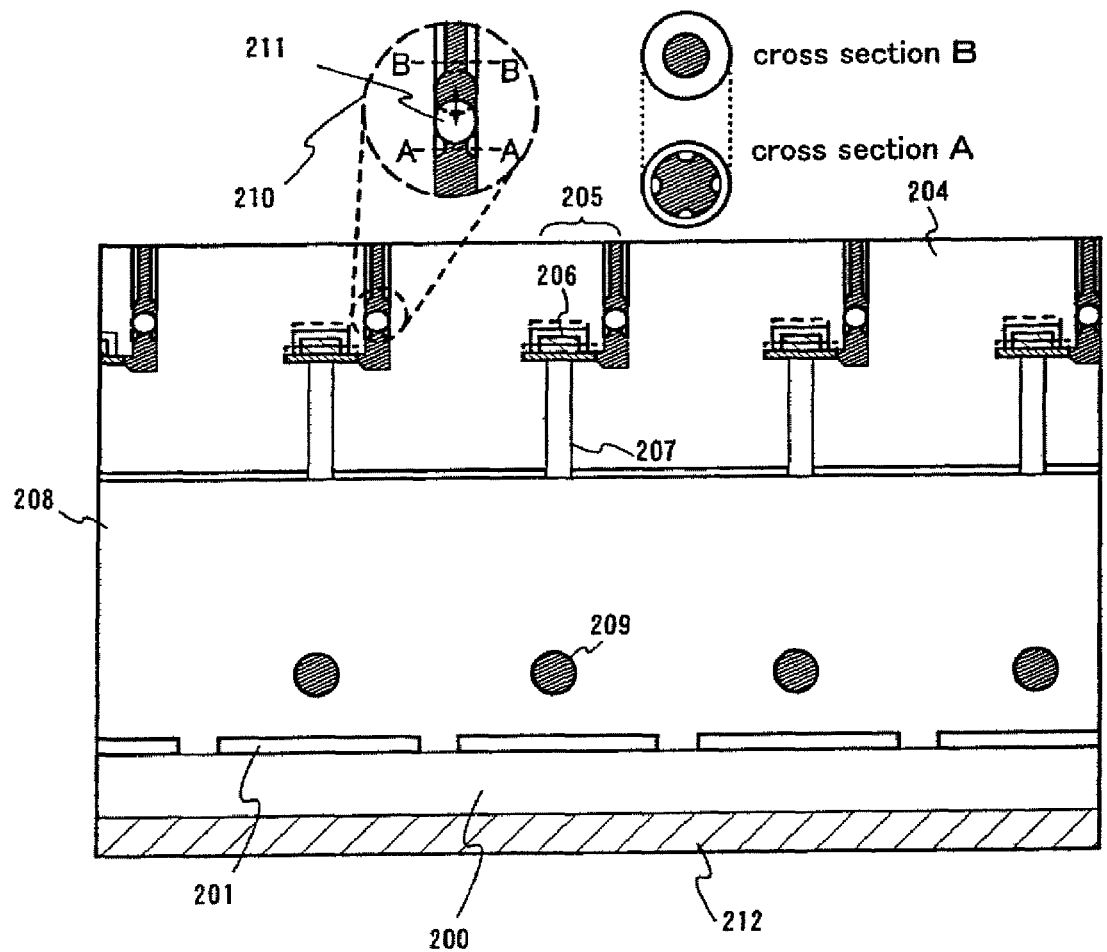
FIGS. 2A and 2B illustrate the Embodiment Mode 1.
Figure 2B:
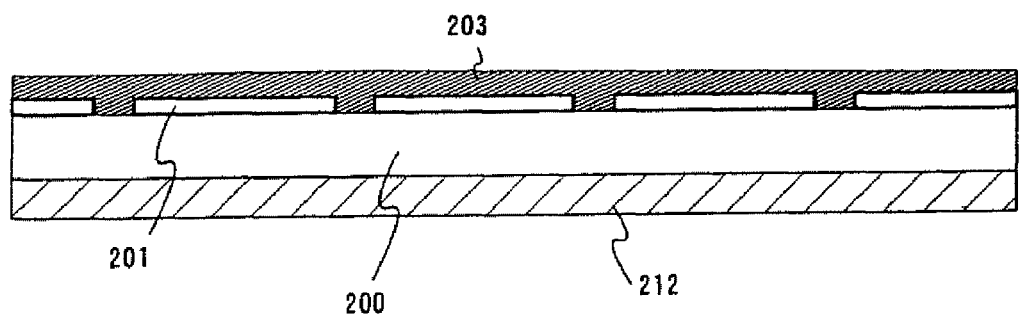

It is preferable to prevent a reverse flow of liquid crystal when ink jet is performed under reduced pressure. When the interior of a treatment chamber in which a liquid crystal is applied by ink jet shall be under reduced pressure, a reverse flow, sudden jetting, or leakage could occur unless pressure regulation is carried out so that the interior of a container storing the liquid crystal material is the similar pressure as inside the treatment chamber. The liquid crystal is defoamed beforehand. Further, it is important to adjust temperature in the container storing the liquid crystal material since the viscosity of a liquid crystal is changeable depending on temperature. A head portion of an ink-jet system may be provided with a temperature controller. When the nozzle is clogged, the liquid crystal may be discharged by heating the head portion so as to reduce the viscosity thereof. FIGS. 2A and 2B show an example of an ink-jet system equipped with a head portion 204 that is provided with a reverse-flow prevention device 210 using a ball 211.

As shown in a cross section A, protrusions are formed in the reverse-flow prevention device, for regulating the floating of the ball, and a liquid crystal is made to flow by the side of the ball. The diameter of the ball is rather smaller than that of a supply pipe, so that the ball can move partly. Further, the ball also mitigates rapid flow of a liquid crystal. The supply pipe is tapered from the middle and it has a smaller diameter than the ball at the end, as shown in cross section B, so that the supply pipe is completely blocked with the ball when liquid crystal flows backward. The head portion 204 has a plurality of discharge portions 205 that can discharge a solution containing an organic compound, and each of which is provided with a piezoelectric element 206. The piezoelectric elements are placed to block the supply pipe; a little space is provided between an inner wall of the pipe and the piezoelectric element due to a vibration, and liquid crystal is made to pass through the space. A liquid crystal can be gushed through the slight space since the pressure inside of the film formation chamber is reduced. Further, each of the discharge portions 205 is filled with liquid crystal 207. FIG. 2A shows a state where a shutter is closed due to a vibration of the piezoelectric element.

Note that, FIG. 2A only shows 5 of the discharge openings; however, a plurality of discharge openings can be arranged parallel, and it may be desirable to arrange the number of discharge portions equivalent to the number of the pixels in a row or in a column, considering the throughput.

A space 208 between the head portion 204 and a pixel electrode 201 is kept under reduced pressure, which is a pressure lower than the atmospheric pressure. Specifically, it is $1 \times 10^2$ Pa to $2 \times 10^4$ Pa in an inert atmosphere (preferably $5 \times 10^2$ Pa to $5 \times 10^3$ Pa). The liquid crystal 207 loaded in the discharge portion 205 is forced out from a discharge opening and discharged on the top of the pixel electrode 201 by opening and shutting the supply pipe with the piezoelectric element 206 and reducing pressure in the film formation chamber. Discharged droplets 209 fall under reduced pressure and reach the pixel electrode 201. The droplets of the liquid crystal are discharged sequentially from the discharge opening at specified time intervals.

If necessary, as shown in FIG. 2B, a substrate 200 may be heated with a heater 212 under reduced pressure during the ink jet step so as to uniform the film thickness by reducing the viscosity of a liquid crystal layer 203.

The workflow of manufacturing a panel will be described below with reference to FIGS. 3A to 3D.

Figure 3A:
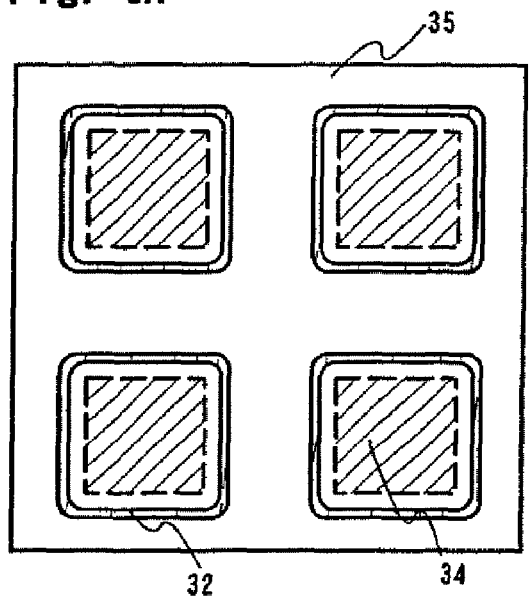
FIGS. 3A to 3D illustrate the Embodiment Mode 1.
Figure 3B:
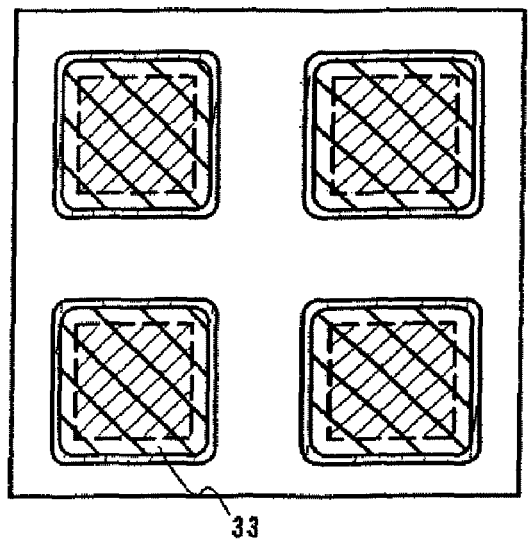

First, the first substrate 35 in which a pixel area 34 is formed over its insulating surface is prepared. The first substrate 35 is pretreated with the following steps: forming an alignment layer, rubbing, dispersing spherical spacers, forming a column spacer, forming a color filter, or the like. Subsequently, a seal material 32 is formed on a predetermined position (a pattern surrounding the pixel area 34) over the first substrate 35 in an inert atmosphere or under reduced pressure by a dispenser, as shown in FIG. 3A. A material containing fillers (diameter of 6 μm to 24 μm), which has a viscosity of 40 Pa·s to 400 Pa·s, is used for the seal material 32 that is translucent. Note that, it is preferable to select a seal material that is insoluble in a liquid crystal to be in contact therewith. A photo cured acrylic resin or a thermosetting acrylic resin may be used for the seal material. Further, the seal material 32 can be formed by printing due to its simple seal pattern.

Subsequently, a liquid crystal 33 is applied to an area surrounded by the seal material 32 by ink jet. A known liquid crystal material with the viscosity that allows discharging by ink jet may be used for the liquid crystal 33. Further, it is suitable to apply a liquid crystal by ink jet since the viscosity of a liquid crystal material can be controlled by adjusting the temperature. The required amount of the liquid crystal 33 can be stored in the area surrounded by the seal material 32 without a loss.

Figure 3C:
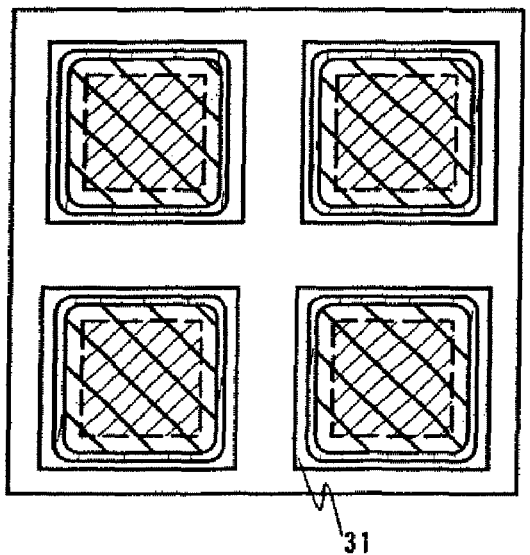
Figure 4A:
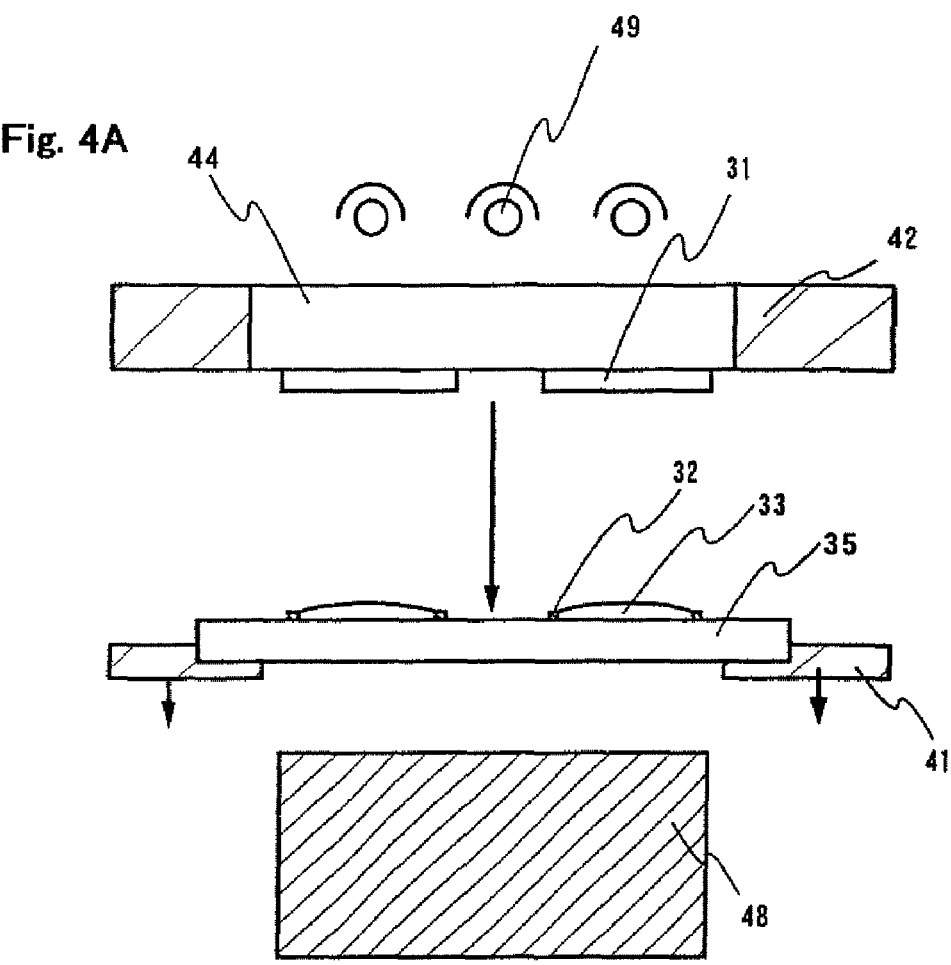
FIGS. 4A and 4B illustrate the Embodiment Mode 1.
Figure 4B:
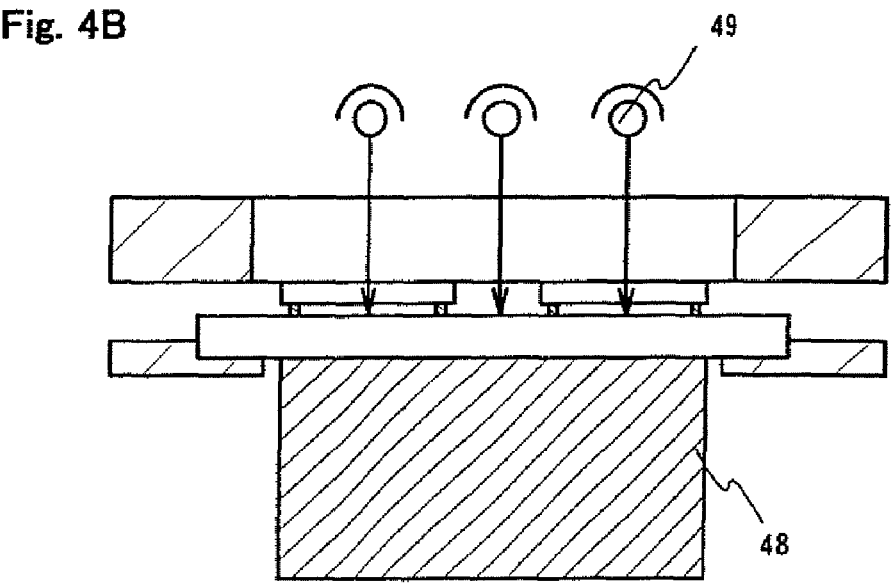

The first substrate 35 provided with a pixel area 34 and the second substrate 31 provided with a counter electrode and an alignment layer are pasted together under reduced pressure without bubbles being mixed in (FIG. 3C). The seal material 32 is cured here by heat-treating or applying a ultra-violet ray while the substrates are pasted together. Note that, heat treatment may be carried out in addition to ultra-violet irradiation. FIGS. 4A and 4B show an example of a pasting device that is capable of ultra-violet irradiation or heat treatment while or after substrates are pasted.

In FIGS. 4A and 4B, reference numeral 41 denotes the first substrate holder, reference numeral 42 denotes the second substrate holder, reference numeral 44 denotes a window, reference numeral 48 denotes a downside measuring plate, and reference numeral 49 denotes a light source. Note that, the same reference numerals in FIGS. 3A to 3D are used for the corresponding parts in FIGS. 4A and 4B.

The bottom downside measuring plate 48 includes a heater, which cures a seal material. The second substrate holder is provided with the window 44, so that ultra-violet light or the like from the light source 49 can transmit therethrough. Although it is not illustrated here, an alignment of a position of the first substrate is performed through the window 44. The second substrate 31 that is to be a counter substrate is severed into a desirable size, and fixed to the second substrate holder 42 with a vacuum chuck or the like. FIG. 4A shows a state before pasting.

On the occasion of pasting, after the first and second substrate holders are lowered, the first substrate 35 and the second substrate 31 are pasted together, and ultra-violet light is applied to cure the seal material in the state unchanged where the substrates are pasted together. A state after pasting is shown in FIG. 4B.

Figure 3D:
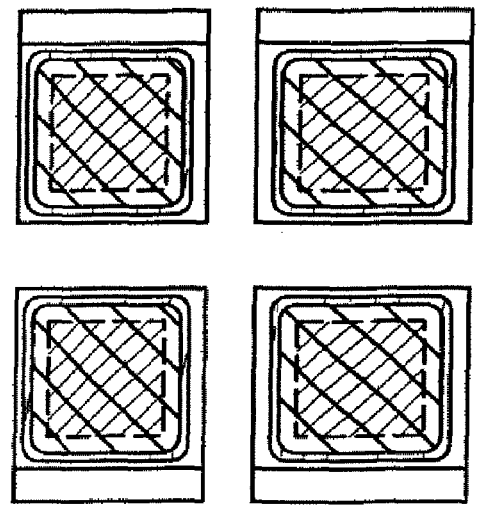

Next, the first substrate 35 is cut by means of a cutting machine such as a scriber, a breaker, or a circular saw (FIG. 3D). Thus, four panels can be manufactured from one substrate.

Note that, the first substrate 35 and the second substrate 34 can be formed from a glass substrate, a quartz substrate, or a plastic substrate.

Embodiment Mode 2

Figure 5A:
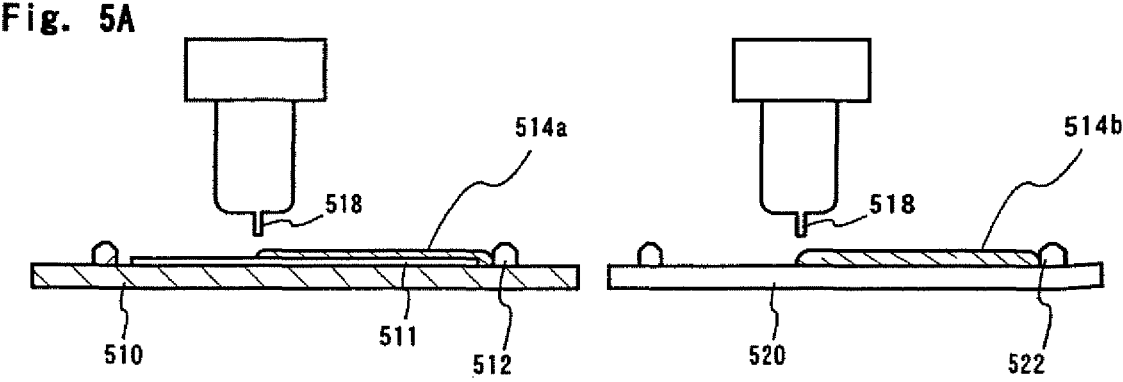
FIGS. 5A to 5C illustrate the Embodiment Mode 2.
Figure 5B:
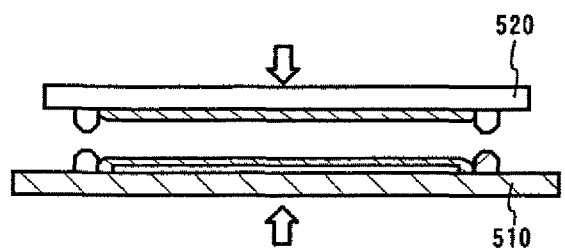
Figure 5C:
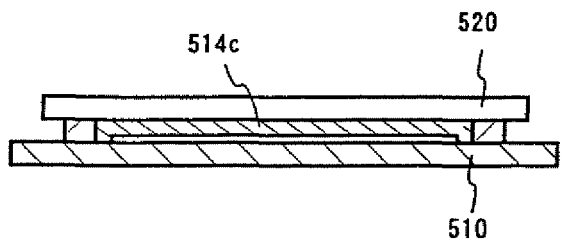

A manufacturing method of a panel that is different from one in Embodiment Mode 1 is shown here in FIGS. 5A to 5C.

First, a liquid crystal is discharged onto both of the first substrate 510 and the second substrate 520 from a nozzle 518 by ink jet, as shown in FIG. 5A.

The first substrate 510 is beforehand provided with a pixel area 511 and the first seal material 512 that surrounds the pixel area. The second seal material 522 is provided over the second substrate 520 so as to retain liquid crystal material 514b. Note that, alignment layers (not illustrated) are provided over both of the substrates beforehand. Further, a spacer (not illustrated) is provided over either or both of the substrates.

Thereafter, the substrates are pasted in an inert atmosphere or under reduced pressure, so that a liquid crystal material 514a over the first substrate and the liquid crystal material 514b over the second substrate overlap one another. The first seal material 512 and the second seal material 522 also overlap one another at that time. Note that, since one of the substrates is turned upside down here as shown in FIG. 5B, a liquid crystal with high viscosity, which does not run down readily, or a liquid crystal that is in a state where the viscosity is increased by being cooled is used. It does not matter if the reversed one of the substrates is thinly coated with liquid crystal material such that the surface thereof is simply wet. The purpose to apply liquid crystal on both of the first and second substrates is to align the crystal liquid to the respective directions along with different rubbing directions of the first and second substrates. Further, another purpose to apply liquid crystal on both of the first and second substrates is to protect the alignment layer of the second substrate when the two substrates are pasted together.

After or concurrently with pasting the substrates together, ultra-violet irradiation or heat treatment is carried out, thereby curing the seal material. Note that, heat treatment may be performed in addition to ultra-violet irradiation. Thus, a liquid crystal 514c can be retained between the pair of the substrates (FIG. 5C).

Further, this embodiment mode can be freely combined with Embodiment Mode 1.

The present invention having the above configuration will be explained in detail with Embodiments shown below.

Embodiment 1

Figure 6:
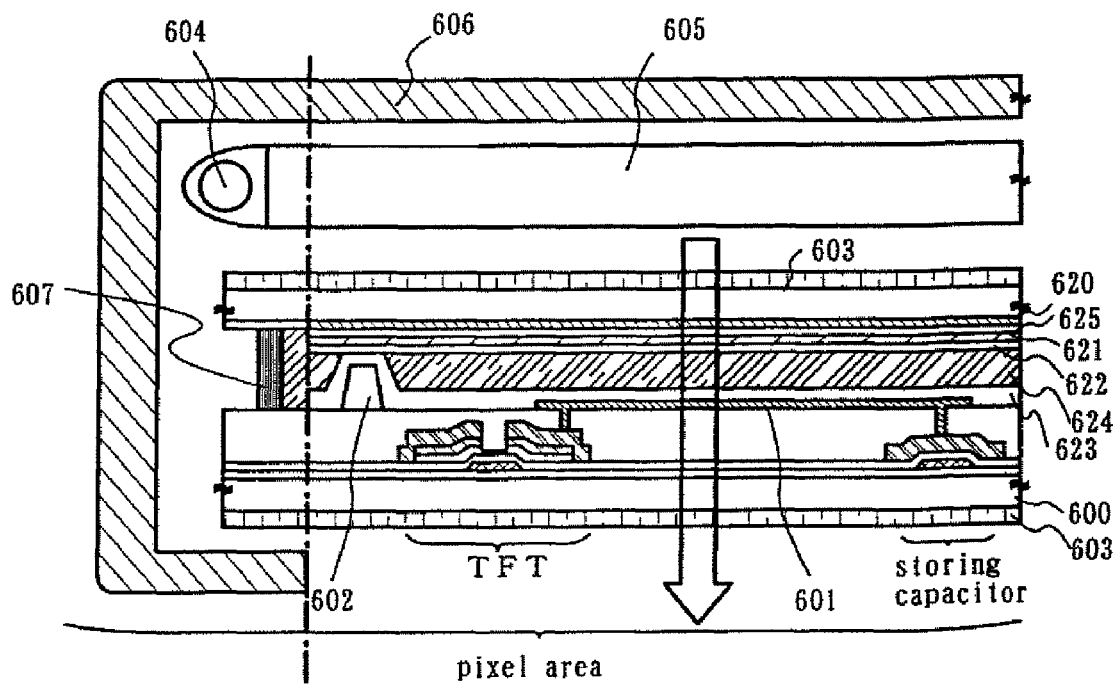
FIG. 6 illustrates a cross-sectional structure of an active matrix type liquid crystal display device (Embodiment 1).

In this embodiment, a manufacturing process of an active matrix liquid crystal display device will be shown with reference to FIG. 6.

First, an active matrix substrate is formed using a substrate 600 that is transparent to light. The substrate with a large area as 600 mm×720 mm, 680 mm×880 mm, 1000 mm×1200 mm, 1100 mm×1250 mm, 1150 mm×1300 mm, 1500 mm×1800 mm, 1800 mm×2000 mm, 2000 mm×2100 mm, 2200 mm×2600 mm, or 2600 mm×3100 mm is desirably used thereby reducing manufacturing costs. A substrate containing barium borosilicate glass, aluminoborosilicate glass, and the like, as typified by #7059 glass or #1737 glass produced by Corning Inc. can be used. In addition, a transparent substrate such as a quartz substrate or a plastic substrate can be used alternatively.

After a conductive layer is deposited entirely over a substrate 600 having an insulating surface by sputtering, the first photolithography process is performed; a resist mask is formed; and an unnecessary part of the resist mask is etched away, thereby forming a wiring and an electrode (a gate electrode, a storage capacitor line, a terminal, and the like). Note that, a base insulating film is formed over the substrate 600, if necessary.

An element selected from the group consisting of Ti, Ta W, Mo, Cr, and Nd, an alloy containing the elements, or a nitride containing the elements may be used for a material of the wiring or the electrode. Further, a plurality of materials selected from an element selected from the group consisting of Ti, Ta W, Mo, Cr, and Nd; an alloy containing the elements; or a nitride containing the elements may be laminated.

When a screen size becomes larger, the length of each line is increased, a problem of high wiring resistance occurs and the power consumption is increased. Accordingly, the lines and electrodes may be formed with a material selected from the group consisting of Cu, Al, Ag, Au, Cr, Fe, Ni, or Pt or an alloy thereof so as to achieve the low power consumption by lowering the wiring resistance. Further, the lines and electrodes may be formed with an independently dispersed nanoparticle dispersed liquid by ink jet. The dispersed liquid contains ultrafine particles (grain diameter of 5 nm to 10 nm) of metal such as Ag, Au, Cu, or Pd which are dispersed in highly concentrations without being aggregated.

Subsequently, a gate insulating film is deposited entirely over the substrate by PCVD. The gate insulating film is formed with a lamination of a silicon nitride film and a silicon oxide film so as to have a thickness of 50 nm to 200 nm, preferably 150 nm. Note that the gate insulating film is not necessarily be a lamination; and a silicon oxide film, a silicon nitride film, a silicon oxynitride film, tantalum oxide film, or the like may be used alternatively.

Next, an amorphous semiconductor film is formed over the gate insulating film using known techniques such as plasma CVD or sputtering with a thickness of 50 nm to 200 nm, preferably 100 nm to 150 nm. Typically, an amorphous silicon (a-Si) film is formed into a thickness of 100 nm. Note that, when the film is formed over a substrate with a large area, the chamber is also enlarged, and if the chamber is evacuated, more treating time and a large amount of film formation gas are required. Accordingly, further cost reduction can be realized by forming the amorphous silicon (a-Si) film by a linear plasma CVD system under the atmospheric pressure.

Thereafter, the second amorphous semiconductor film with a thickness of 20 nm to 80 nm, which contains an impurity element having one conductive type (n type or p type) is formed. The second amorphous semiconductor film including an impurity element that imparts single conductivity is deposited entirely using known techniques such as plasma CVD or sputtering. In this embodiment, the second amorphous silicon film containing an n type impurity element is deposited by using a silicon target being added with phosphorus.

Next, a resist mask is formed by the second photolithography process, and an unnecessary portion is etched away, thereby forming the first amorphous semiconductor island film and the second amorphous semiconductor island film. On this occasion, etching is carried out by wet etching or dry etching.

After a conductive layer that covers the second island amorphous semiconductor film by sputtering, the third photolithography process is performed, a resist mask is formed; an unnecessary portion is removed, so that lines and electrodes (a source line, a drain line, a storage capacitor, or the like) are formed. An element selected from the group consisting of metals such as Al, Ti, Ta W, Mo, Cr, Nd, Cu, Ag, Au, Fe, Ni, and Pt, or an alloy of the elements may be formed as materials for the lines and the electrodes. An independently dispersed nano particle dispersed liquid may be used for forming the lines and electrodes. The dispersed liquid contains ultrafine particles (grain diameter of 5 nm to 10 nm) of metal such as Ag, Au, Cu, or Pd which are dispersed in high concentrations without being aggregated. When the lines and electrodes are formed by ink jet, the photolithography process is unnecessary, so that further cost reduction can be achieved.

A resist mask is formed by the fourth photolithography process, and a source electrode and a drain electrode are formed by etching an unnecessary portion away. Etching is performed by wet etching or dry etching. A storage capacitor having an insulating film as a dielectric that is formed with the same material of the gate insulating film is formed. A part of the second amorphous semiconductor film is etched away by using the source line and the drain electrode as masks; further, a part of the first semiconductor film is thinned by the etching. The thinned area is to be a channel forming region of a TFT.

A protective film containing a silicon nitride film with a thickness of 150 nm and the first interlayer insulating film containing a silicon oxynitride film with a thickness of 150 nm are formed entirely by plasma CVD. Note that, in the case where the films are formed over a substrate with a large area, the chamber is also enlarged and if a vacuum is formed inside the chamber, more treating time and a large amount of a film formation gas are required. Accordingly, further cost reduction can be realized by forming the amorphous silicon (a-Si) film by linear plasma CVD under the atmospheric pressure. Thereafter, a channel etch TFT is finished by hydrogenation.

Note that, a channel etched type is given as an example of a TFT structure; however, the structure is not limited thereto. Any one of the structures of a channel stopper type TFT, a top gate TFT, or a staggered TFT may be applied.

Next, the fifth photolithography process is carried out; a resist mask is formed; a contact hole reaching the drain electrode or the storage capacitor electrode is formed by dry etching. Concurrently, a contact hole (not illustrated) for connecting a gate line and a terminal area may be formed in the terminal area, and a metal line which electrically connects the gate line and the terminal area may be formed. Further, a contact hole that reaches the source line may be formed and a metal line that leads out from the source line may be formed. A pixel electrode containing ITO or the like may be formed after the above metal lines are formed, or the metal lines may be formed after the pixel electrode containing ITO or the like is formed.

Next, a transparent electrode with a thickness of 110 nm, which contains ITO (indium tin oxide), a zinc oxide-indium oxide alloy ($In_2O_3$—ZnO), or zinc oxide (ZnO) is formed. Thereafter a pixel electrode 601 is formed by the sixth photolithography process and etching.

Thus, an active matrix substrate including a source line, an inversely staggered a-Si TFT, a storage capacitor, and a terminal area can be manufactured by six photolithography processes.

Rubbing is performed after an alignment layer 623 is formed over the active matrix substrate. Note that, in this embodiment, a column spacer 602 for maintaining a gap between substrates is formed in a predetermined position by patterning an organic resin film such as an acrylic resin film. Further, spherical spacers may be discharged all over the substrate instead of a column spacer.

A counter substrate is prepared. The counter substrate is provided with a color filter 620 in which a colored layer and a light shielding layer are disposed correspondingly to each pixel. A planarization layer 625 is provided to cover the color filter and the light shielding layer. Subsequently, a counter electrode 621 containing a transparent conductive film is formed over the planarization layer so as to overlap the pixel area. An alignment layer 622 is formed entirely over the counter substrate and then rubbing is performed.

After a seal material is applied so as to surround the pixel area of the active matrix substrate, liquid crystal is discharged onto the area surrounded by the seal material by ink jet. Thereafter, the active matrix substrate and the counter substrate are pasted together with a seal material 607 under reduced pressure, without being exposed to the atmosphere. The seal material 607 is added with fillers (not illustrated). The two substrates can be pasted together with the fillers and the column spacer 602, so that the gap between the substrates has a uniform thickness. By employing the method of discharging liquid crystal by ink jet, the amount of a liquid crystal used in a manufacturing process can be reduced, and the cost can be considerably reduced particularly when a substrate with a large area is used.

Thus, an active matrix liquid crystal display device can be finished. Note that, if necessary, the active matrix substrate or the counter substrate is cut into a desirable shape. Further, an optical film such as a polarizing film 603 is provided fittingly using known techniques. An FPC is further pasted to the substrate using known techniques.

A liquid crystal module obtained according to the above steps is provided with a backlight 604 and an optical waveguide 605. An active matrix liquid crystal display device (transsmissive type) is completed by covering the liquid crystal module with a cover 606. A part of the cross section thereof is shown in FIG. 6. Note that, the cover and the liquid crystal module are fixed with an adhesive or an organic resin. The polarizing film 603 is pasted to each of the active matrix substrate and the counter substrate, since the liquid crystal display device is a transmissive type.

Further, an example of the transmissive type is shown in this embodiment; however, it is not limited thereto, and a reflective or transflective liquid crystal display device can also be manufactured. When a reflective liquid crystal display device is obtained, a metal film with high reflectance, typically, a material film containing aluminum or silver in major proportions, or a lamination of those may be used for a pixel electrode.

Further, this embodiment can be freely combined with Embodiment Mode 1 or Embodiment Mode 2.

Embodiment 2

Figure 7A:
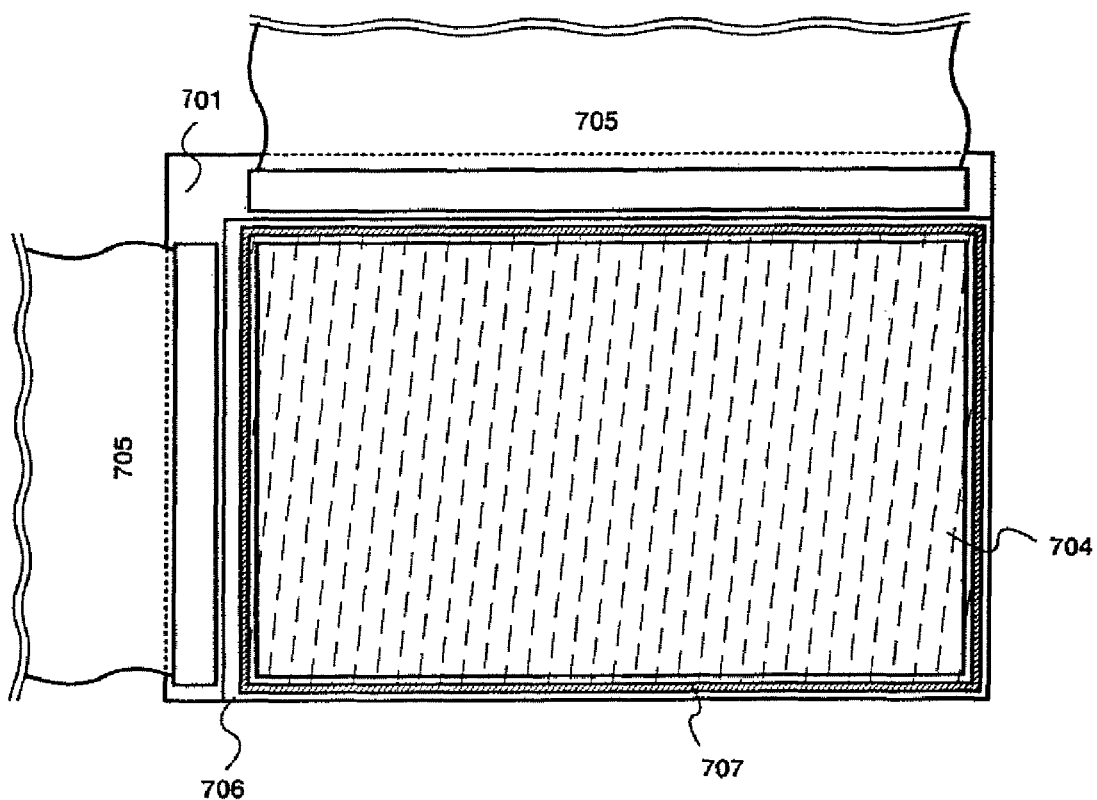
FIGS. 7A and 7B illustrate a top view of a liquid crystal module (Embodiment 2).
Figure 7B:
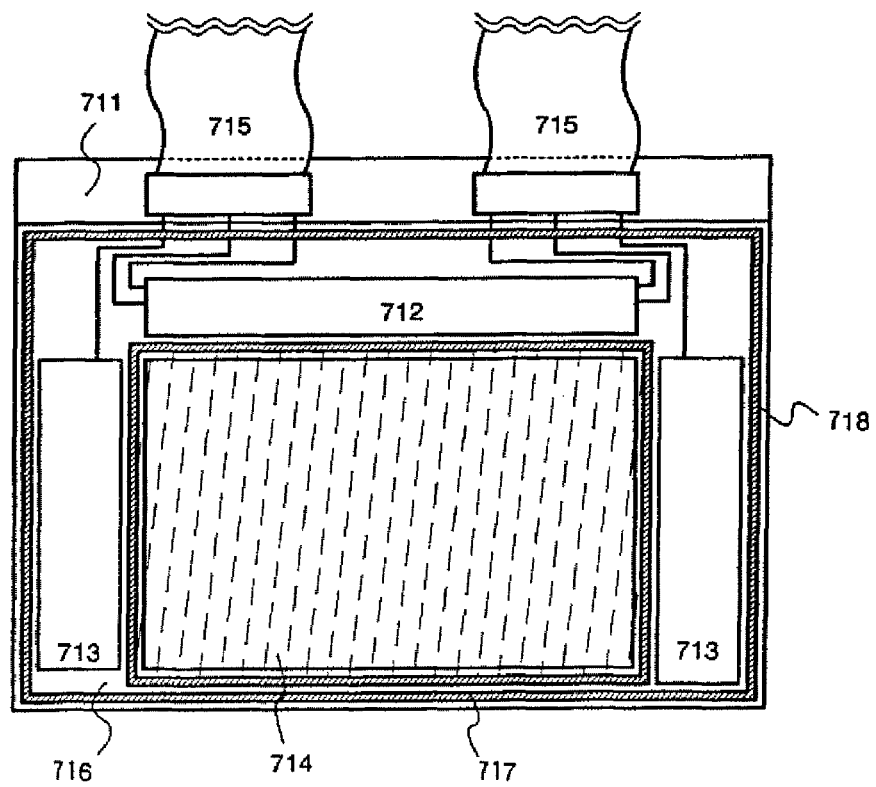

A top view of a liquid crystal module obtained according to Embodiment 1 is shown in FIG. 7A. A liquid crystal module of this embodiment, which is different from the one in Embodiment 1, is shown in FIG. 7B.

A TFT in which an active layer contains an amorphous semiconductor film, obtained according to Embodiment 1, has low field-effect mobility of around 1 $cm^2$/Vsec. Therefore, a driver circuit for displaying an image is formed with an IC chip, and is mounted in TAB (Tape Automated Bonding) or COG (Chip On Glass).

In FIG. 7A, reference numeral 701 denotes an active matrix substrate, reference numeral 706 denotes a counter substrate, reference numeral 704 denotes a pixel area, reference numeral 707 denotes a seal material, and reference numeral 705 denotes an FPC. Note that, liquid crystal is discharged under reduced pressure by ink jet, and a pair of substrates 701 and 706 are pasted together with the seal material 707.

A TFT obtained according to Embodiment 1 has low field-effect mobility; however, when mass production is carried out by using a substrate with a large area, the manufacturing cost can be reduced since the TFT can be formed at lower temperatures. A liquid crystal is discharged by ink jet and a pair of substrates are pasted together in the present invention. That allows any size of a pair of substrates to have a liquid crystal in a gap therebetween. Thus, a display device provided with such a liquid crystal panel with a large area as 20 inches to 80 inches, which is like the one shown in FIG. 8, can be manufactured.

Figure 8:
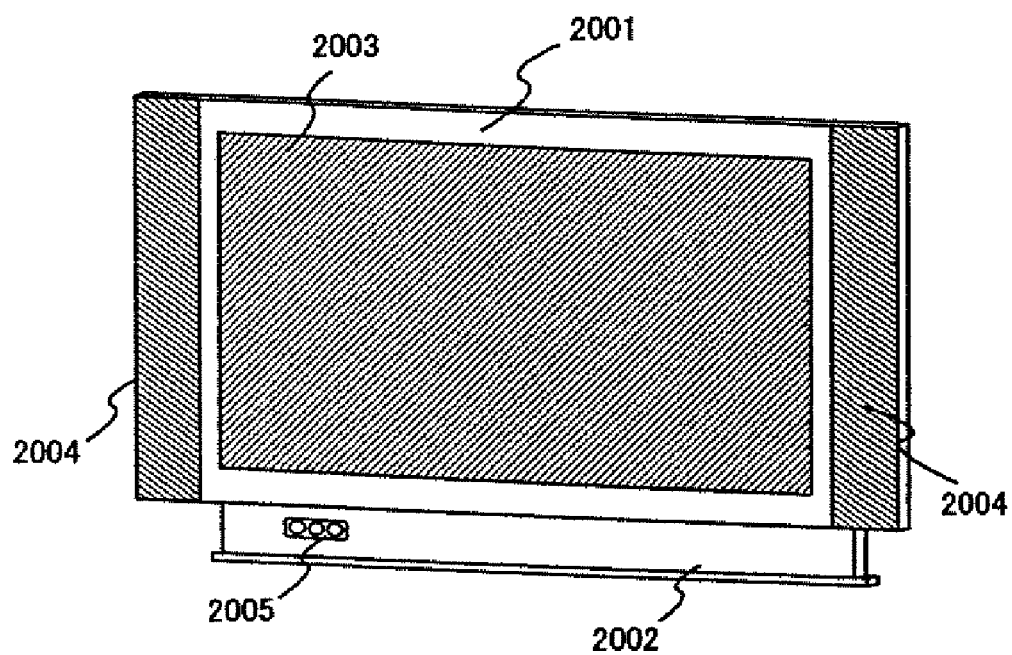
FIG. 8 illustrates a display device with a large screen (Embodiment 2).

A display device shown in FIG. 8 is a display device provided with a liquid crystal panel having a huge screen of 20 inches to 80 inches, which includes a frame 2001, a supporting base 2002, a display area 2003, speaker units 2004, a video input terminal 2005, and the like. The present invention can be applied to the display area 2003.

When an active layer is formed of a crystalline semiconductor film, typically, a polysilicon film, which is formed by crystallizing an amorphous semiconductor film using known techniques, a TFT having high field-effect mobility can be obtained. Therefore, a driver circuit comprising a CMOS circuit as well as a pixel area can be formed on one substrate. Further, in addition to a driver circuit, functional circuits such as a CPU as can be formed on the same substrate.

When a TFT having an active layer that is formed of a polysilicon film is used, a liquid crystal module like the one shown in FIG. 7B can be manufactured.

In FIG. 7B, reference numeral 711 denotes an active matrix substrate, reference numeral 716 denotes a counter substrate, reference numeral 712 denotes a source signal line driver circuit, reference numeral 713 denotes a gate signal line driver circuit, reference numeral 714 denotes a pixel area, reference numeral 717 denotes the first seal material, and reference numeral 715 denotes an FPC. Note that, a liquid crystal is discharged under reduced pressure by ink jet, and a pair of substrates 711 and 716 are pasted together with the first seal material 717 and the second seal material. Since a liquid crystal is not necessary in the driver circuits 712 and 713, a liquid crystal is retained only in the pixel area 714. The second seal material 718 is provided to reinforce the whole panel.

When the substrates are pasted together under reduced pressure, it is preferable to fill the space between the first seal material 717 and the second seal material 718 with a filling other than a liquid crystal, a resin, for example.

This embodiment can be freely combined with Embodiment Modes 1 or 2, or Embodiment 1.

Embodiment 3

Various modules (active matrix type liquid crystal modules or passive matrix type liquid crystal modules) can be completed by implementing the present invention. Accordingly, all electronic devices incorporating such modules in the display areas can be completed.

The following can be given as examples of such electronic devices: video cameras; digital cameras; head mounted displays (goggle type displays); car navigation systems; projectors; car stereos; personal computers; personal digital assistants (mobile computers, mobile phones or electronic books and the like); and the like. Practical examples of the above electronics devices are shown in FIGS. 9A to 9C and FIGS. 10A and 10B.

Figure 9A:
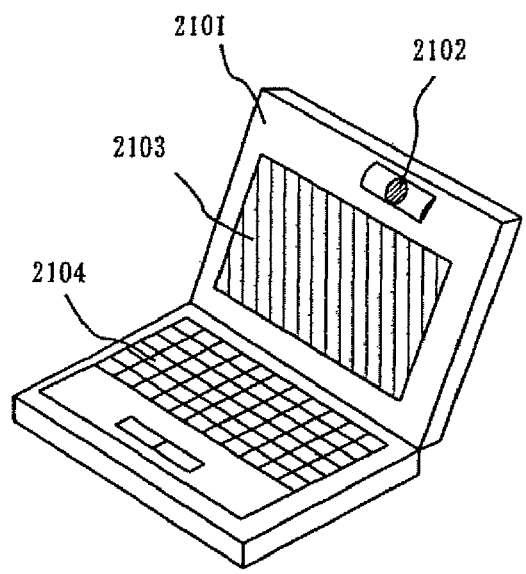
FIGS. 9A to 9C illustrate examples of electronic devices (Embodiment 3).

FIG. 9A shows a personal computer which includes: a main body 2001; an image input portion 2002; a display area 2003; a keyboard 2004; and the like.

Figure 9B:
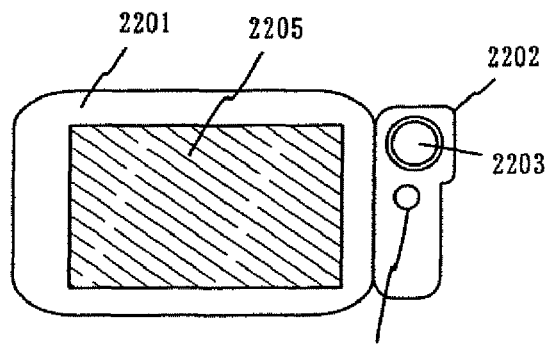

FIG. 9B shows a mobile computer which includes: a main body 2201; a camera portion 2202; an image receiving portion 2203; operation switches 2204; a display area 2205; and the like.

Figure 9C:
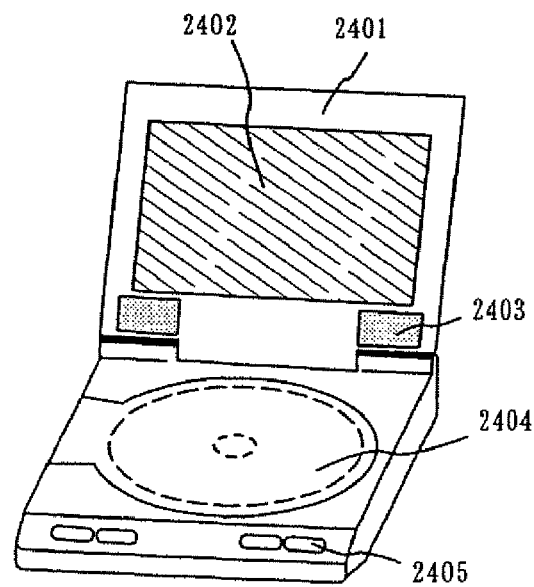

FIG. 9C shows a player using a recording medium storing a program (hereinafter referred to as a recording medium), which includes: a main body 2401; a display area 2402; a speaker portion 2403; a recording medium 2404; an operation switch 2405; and the like. Note that a DVD (Digital Versatile Disc), a CD or the like is used as a recording medium for this player, and the player enables music listening, viewing movies, playing games or the Internet can be done.

Figure 10A:
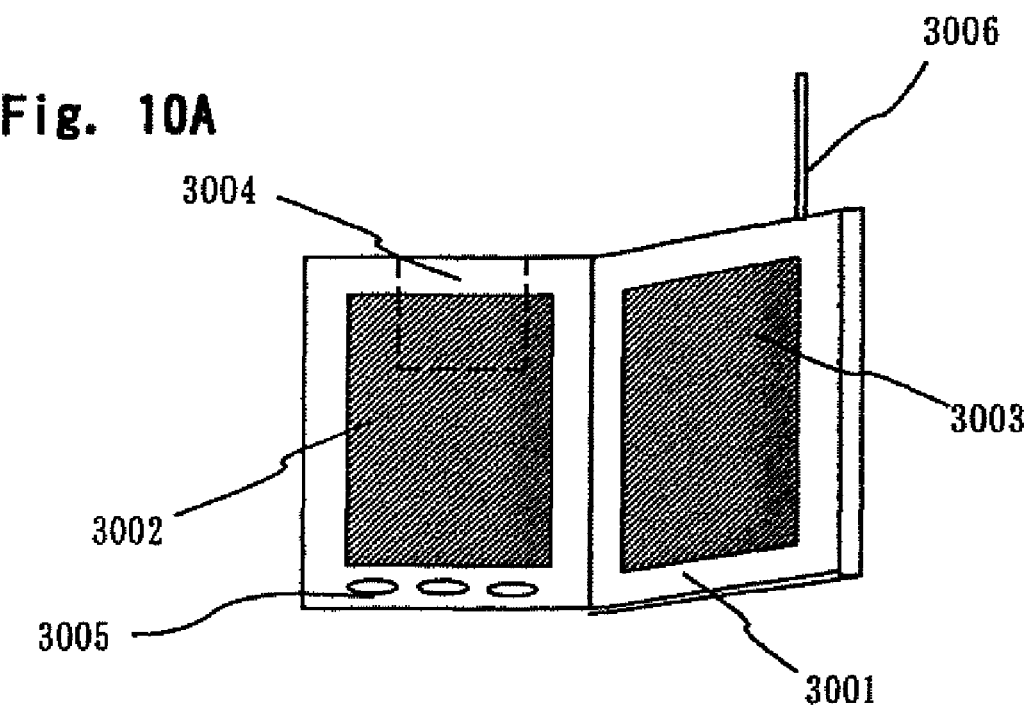
FIGS. 10A and 10B illustrate examples of electronic devices (Embodiment 3).

FIG. 10A shows a portable book (electronic book) which includes: a main body 3001; display areas 3002 and 3003; a recording medium 3004; operation switches 3005; an antenna 3006; and the like.

Figure 10B:
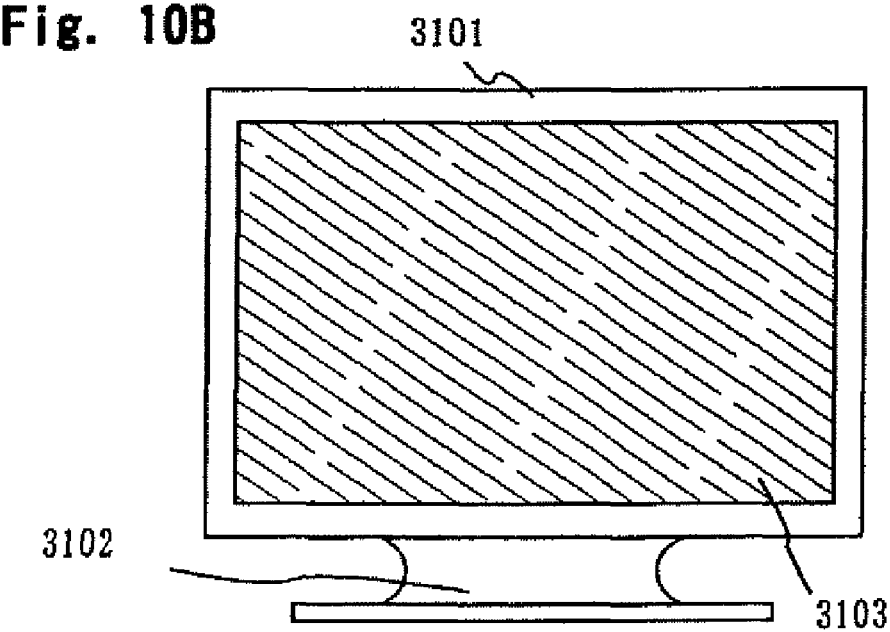

FIG. 10B shows a display device which includes: a main body 3101; a support 3102; a display area 3103; and the like.

In addition, the display shown in FIG. 10B has a screen in small, medium or large size, for example, a size of 5 inches to 20 inches. Further, to manufacture the display part with such sizes, it is preferable to dice substrates with one square meter to mass-produce multiples of panels.

As described above, the application range of the present invention is so wide that the invention can be applied to electronic devices of various fields. Note that the electronic devices of this embodiment can be offered by utilizing any combination of Embodiment Mode 1 and 2 and Embodiments 1 and 2.

The present invention make it possible to mass-produce liquid crystal display devices having large screens with sizes of 20 inches to 80 inches.

What is claimed is:

1. A method for manufacturing an electronic device comprising:
    forming an alignment layer over a first substrate;
    performing a rubbing on the alignment layer in a rubbing direction;
    forming a first seal material layer that surrounds a first pixel area;
    forming a second seal material layer that surrounds a second pixel area;
    discharging a first liquid crystal toward the first pixel area under a pressure lower than atmospheric pressure to provide a first layer comprising the first liquid crystal; and
    discharging a second liquid crystal toward the second pixel area under the pressure lower than atmospheric pressure to provide a second layer comprising the second liquid crystal,
    wherein the first liquid crystal is discharged from a plurality of first nozzles arranged linearly,
    wherein the second liquid crystal is discharged from a plurality of second nozzles arranged linearly, and
    wherein the plurality of first nozzles and the plurality of second nozzles are scanned simultaneously.

2. The method for manufacturing an electronic device according to claim 1, wherein the first droplets and the second liquid crystals are discharged in an atmosphere containing an inert gas under the pressure lower than atmospheric pressure.

3. The method for manufacturing an electronic device according to claim 2, wherein the inert gas is selected from the group consisting of nitrogen and rare gas.

4. The method for manufacturing an electronic device according to claim 1, wherein the pressure lower than atmospheric pressure is $1 \times 10^2$ Pa to $2 \times 10^4$ Pa.

5. A method for manufacturing an electronic device comprising:
    forming an alignment layer over a first substrate;
    performing a rubbing on the alignment layer in a rubbing direction;
    forming a first seal material layer that surrounds first pixel electrodes provided on the first substrate;
    forming a second seal material layer that surrounds second pixel electrodes provided on the first substrate;
    discharging a first liquid crystal toward the first pixel electrodes under a pressure lower than atmospheric pressure to provide a first layer comprising the first liquid crystal over the first pixel electrodes; and
    discharging a second liquid crystal toward the second pixel electrodes under the pressure lower than atmospheric pressure to provide a second layer comprising the second liquid crystal over the second pixel electrodes,
    wherein the first liquid crystal is discharged from a plurality of first nozzles arranged linearly, wherein the second liquid crystal is discharged from a plurality of second nozzles arranged linearly, and wherein the plurality of first nozzles and the plurality of second nozzles are scanned simultaneously.

6. The method for manufacturing an electronic device according to claim 5, wherein the first and the second liquid crystals are discharged in an atmosphere containing an inert gas under the pressure lower than atmospheric pressure.

7. The method for manufacturing an electronic device according to claim 6, wherein the inert gas is selected from the group consisting of nitrogen and rare gas.

8. The method for manufacturing an electronic device according to claim 5, wherein the pressure lower than atmospheric pressure is $1\times10^2$ Pa to $2\times10^4$ Pa.

9. The method for manufacturing an electronic device according to claim 5, wherein the first pixel electrodes and the second pixel electrodes are comprise a metal.

10. The method for manufacturing an electronic device according to claim 5, wherein the first pixel electrodes and the second pixel electrodes are transparent.

11. The method for manufacturing an electronic device according to claim 5, wherein the first pixel electrodes and the second pixel electrodes comprise a material selected from the group consisting of indium tin oxide, zinc oxide-indium oxide alloy and zinc oxide.

12. The method for manufacturing an electronic device according to claim 1,
wherein first droplets of the first liquid crystal and second droplets of the second liquid crystal are discharged by an ink jet method.

13. The method for manufacturing an electronic device according to claim 5,
wherein first droplets of the first liquid crystal and second droplets of the second liquid crystal are discharged by an ink jet method.

* * * * *

UNITED STATES PATENT AND TRADEMARK OFFICE
CERTIFICATE OF CORRECTION

PATENT NO. : 8,284,375 B2
APPLICATION NO. : 12/541187
DATED : October 9, 2012
INVENTOR(S) : Shunpei Yamazaki et al.

It is certified that error appears in the above-identified patent and that said Letters Patent is hereby corrected as shown below:

In the Claims:

Column 14, Claim 2, line 2, "the first droplets and the second liquid crystals" should read "the first and the second liquid crystals"

Signed and Sealed this
Twenty-eighth Day of May, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,284,375 B2  
APPLICATION NO. : 12/541187  
DATED : October 9, 2012  
INVENTOR(S) : Shunpei Yamazaki et al.

Page 1 of 1

It is certified that error appears in the above-identified patent and that said Letters Patent is hereby corrected as shown below:

In the Claims:

Column 14, lines 40-41 (Claim 2, lines 2-3) "the first droplets and the second liquid crystals" should read "the first and the second liquid crystals"

This certificate supersedes the Certificate of Correction issued May 28, 2013.

Signed and Sealed this  
Eighteenth Day of June, 2013

Teresa Stanek Rea  
*Acting Director of the United States Patent and Trademark Office*